(12) United States Patent
Bristow et al.

(10) Patent No.: US 8,852,678 B2
(45) Date of Patent: Oct. 7, 2014

(54) CHITOSAN-COATED HYDROPHOBIC GLASS AND METHOD OF MAKING

(75) Inventors: Joseph Bristow, Goose Creek, SC (US); Richard M. DeMarco, Kinnelon, NJ (US)

(73) Assignee: Agratech International, Inc., Goose Creek, SC (US)

( * ) Notice: Subject to any disclaimer, the term of this patent is extended or adjusted under 35 U.S.C. 154(b) by 0 days.

(21) Appl. No.: 12/406,576

(22) Filed: Mar. 18, 2009

(65) Prior Publication Data

US 2009/0239084 A1    Sep. 24, 2009

Related U.S. Application Data

(60) Provisional application No. 61/037,777, filed on Mar. 19, 2008.

(51) Int. Cl.
  C03C 17/32    (2006.01)
  C03C 17/34    (2006.01)

(52) U.S. Cl.
  CPC ............. *C03C 17/32* (2013.01); *C03C 2218/32* (2013.01); *C03C 2217/76* (2013.01); *C03C 17/3405* (2013.01)
  USPC ........ 427/169; 427/163.1; 427/165; 427/301; 427/430.1

(58) Field of Classification Search
  USPC ....................................................... 427/430.1
  See application file for complete search history.

(56) References Cited

U.S. PATENT DOCUMENTS

| | | | |
|---|---|---|---|
| 4,326,532 A | 4/1982 | Hammar | |
| 5,668,193 A | 9/1997 | Gouda et al. | |
| 6,197,322 B1 | 3/2001 | Dutkiewicz et al. | |
| 6,733,889 B2 | 5/2004 | Varanasi et al. | |
| 6,818,309 B1 | 11/2004 | Talpaert et al. | |
| 6,858,312 B2 | 2/2005 | Kobayashi et al. | |
| 7,288,532 B1 | 10/2007 | Payne et al. | |
| 2003/0228470 A1* | 12/2003 | Allaire et al. | 428/426 |
| 2005/0118239 A1 | 6/2005 | Sabesan | |
| 2006/0177489 A1 | 8/2006 | Massouda et al. | |
| 2006/0182981 A1 | 8/2006 | DeBergalis et al. | |
| 2007/0202136 A1 | 8/2007 | Legeay et al. | |
| 2007/0275245 A1 | 11/2007 | Persson et al. | |
| 2010/0291306 A1* | 11/2010 | Tsuchida et al. | 427/384 |

FOREIGN PATENT DOCUMENTS

| | | |
|---|---|---|
| EP | 1825752 A2 | 8/2007 |
| EP | 1826249 A1 | 8/2007 |
| JP | 56-47439 A | 4/1981 |
| JP | 64-19303 A | 1/1989 |
| JP | 3-271375 A | 12/1991 |
| JP | 06-220218 A | 8/1994 |
| JP | 62-29978 A | 8/1994 |
| JP | 11-14909 A | 1/1999 |
| JP | 11-293149 A | 10/1999 |
| JP | 2005-132877 A | 5/2005 |
| JP | 2007-224263 A | 9/2007 |
| RU | 2269494 C2 | 2/2006 |
| RU | 2309917 C2 | 11/2007 |
| WO | 2005/105690 A2 | 11/2005 |
| WO | WO 2007086211 A1 * | 8/2007 |

OTHER PUBLICATIONS

English Abstract of European Patent Publication No. 1 825 752, published Aug. 29, 2007.
English Abstract of European Patent Publication No. 1 826 249, published Aug. 29, 2007.
English Abstract of Japanese Patent Publication No. 11-14909, published Jan. 22, 1999.
English Abstract of Japanese Patent Publication No. 11-293149, published Oct. 26, 1999.
English Abstract of Japanese Patent Publication No. 56-47439, published Apr. 30, 1981.
English Abstract of Japanese Patent Publication No. 62-29978, published Aug. 19, 1994.
Chen, Tianhong, et al., "Enzymatic Grafting of Hexyloxyphenol onto Chitosan to Alter Surface and Rheological Properties", Biotechnology and Bioengineering, Dec. 5, 2000, pp. 564-573, vol. 70, No. 5, John Wiley & Sons, Inc.
Chiba, Koji, et al., "Preparation and Block Copolymerization of Oligodihexanoylchitin Having Hydroxy Groups at Both Ends", Journal of Polymer Science: Part A: Polymer Chemistry, 1994, pp. 2619-2624, vol. 32, John Wiley & Sons, Inc.
Hosokawa, Jun, et al., "Reaction between Chitosan and Cellulose on Biodegradable Composite Film Formation", Ind. Eng. Chem. Res., 1991, pp. 788-792, vol. 30, No. 4, American Chemical Society.
International Search Report for PCT/US2009/037526, international filing date of Mar. 18, 2009, mailed Jun. 15, 2009, 7 pages.
Kawamura, Yoshihide, et al., "Adsorption of Metal Ions on Polyaminated Highly Porous Chitosan Chelating Resin", Ind. Eng. Chem. Res., 1993, pp. 386-391, vol. 32, No. 2, American Chemical Society.
Kim, Jae-Kwon, et al., "Effects of polymer grafting on a glass surface for protein chip applications", Colloids and Surfaces B: Biointerfaces 33, 2004, pp. 67-75.
Kumar, G., et al., "Enzymatic gelation of the natural polymer chitosan", 2000, pp. 2157-2168, Polymer 41, Elsevier Science Ltd.
Liu, Xiang Dong, et al., "Surface modification of nonporous glass beads with chitosan and their adsorption property for transition metal ions", Carbohydrate Polymers 49, 2002, pp. 103-108, Elsevier Science Ltd.
Liu, X.D., et al., "A novel method for immobilization of chitosan onto porous glass beads through a 1,3-thiazolidine linker", Polymer 44, 2003, pp. 1021-1026, Elsevier Science Ltd.

(Continued)

*Primary Examiner* — David Turocy
(74) *Attorney, Agent, or Firm* — Cantor Colburn LLP

(57) ABSTRACT

Glass surfaces, for example, windshield surfaces, have a durable hydrophobic coating applied thereto. The glass surface is first treated by any suitable method to enhance the ability of a chitosan polymer coating to durably or substantially permanently adhere thereto. Once the chitosan coating has been applied to the glass surface, the normally hydrophilic chitosan coating is rendered hydrophobic by suitable treatment, for example, by a combination of enzymatic and chemical treatments. Alternatively, the chitosan may be rendered hydrophobic prior to coating it on the glass surface, but that is a less preferred technique. The method of the invention provides a glass article having a hydrophobic surface.

14 Claims, No Drawings

(56) References Cited

OTHER PUBLICATIONS

Muzzarelli, Riccardo, et al., "Characteristic Properties of N-Carboxybutyl Chitosan", Carbohydrate Polymers 11, 1989, pp. 307-320, Elsevier Science Publishers Ltd., Great Britain.

Nakatsuka, Shuji, et al., "Permeability of Vitamin B-12 in Chitosan Membranes. Effect of Crosslinking and Blending with Poly (vinyl alcohol) on Permeability", Journal of Applied Polymer Science, 1992, pp. 17-28, vol. 44, John Wiley & Sons, Inc.

Pantano, Carlo G., "The Dominick Labino Lecture. Glass Surfaces: Old, New and Engineered", The Glass Art Society Journal, 2003, pp. 82-85, ill, 0278-9426.

Payne, Gregory F., et al., "Enzyme-catalysed polymer modification: reaction of phenolic compounds with chitosan films", Polymer, 1996, pp. 4643-4648, vol. 37, No. 20, Elsevier Science Ltd., Great Britain.

Qurashi, M.T., et al., "Studies on Modified Chitosan Membranes. I. Preparation and Characterization", Journal of Applied Polymer Science, 1992, pp. 255-261, vol. 46, John Wiley & Sons, Inc.

Qurashi, M.T., et al., "Studies on Modified Chitosan Membranes. II. Dialysis of Low Molecular Weight Metabolites", Journal of Applied Polymer Science, 1992, pp. 263-269, vol. 46, John Wiley & Sons, Inc.

Rorrer, Gregory L., et al., "Synthesis of Porous-Magnetic Chitosan Beads for Removal of Cadmium Ions From Waste Water", Ind. Eng. Chem. Res., 1993, pp. 2170-2178, Vol. 32, American Chemical Society.

Wei, Y.C., et al., "The Crosslinking of Chitosan Fibers", Journal of Polymer Science: Part A: Polymer Chemistry, 1992, pp. 2187-2193, vol. 30, John Wiley & Sons, Inc.

Written Opinion for PCT/US2009/037526, international filing date of Mar. 18, 2009, mailed Jun. 15, 2009, 8 pages.

Yao, Kang De, et al., "Swelling Kinetics and Release Characteristic of Crosslinked Chitosan: Polyether Polymer Network (Semi-IPN) Hydrogels", Journal of Polymer Science: Part A: Polymer Chemistry, 1994, pp. 1213-1223, vol. 32, John Wiley & Sons, Inc.

English Abstract of Japanese Patent Publication No. 3-271375, published Dec. 3, 1991.

English Abstract of Japanese Patent Publication No. 64-19303, published Jan. 23, 1989.

International Preliminary Report on Patentability for PCT/US2009/037526, international filing date of Mar. 18, 2009, mailed Jun. 30, 2010, 9 pages.

Chinese office action issued in corresponding Chinese Patent Application No. 200980118005.1, dated Sep. 26, 2012, with English translation, 20 pages.

Japanese office action issued in corresponding Japanese Patent Application No. 2011-500925, dated Jul. 30, 2013, with English translation, 6 pages.

\* cited by examiner

CHITOSAN-COATED HYDROPHOBIC GLASS AND METHOD OF MAKING

CROSS-REFERENCE TO RELATED APPLICATION

This application claims the benefit of priority of provisional patent application Ser. No. 61/037,777, filed on Mar. 19, 2008, entitled "MODIFIED CHITOSAN-COATED HYDROPHOBIC GLASS AND METHOD OF MAKING".

BACKGROUND OF THE INVENTION

1. Field of the Invention

The present invention concerns a method of providing on a glass surface a hydrophobic coating comprising a suitably treated chitosan biopolymer, and the resulting coated glass article.

2. Related Art

The desirability of providing a hydrophobic surface to windshields has driven the sales of products, usually silicone-based, which, when applied to the surface of a windshield or other glass, create a hydrophobic film that causes water to run off the glass. A drawback of such products is that they are soon worn away by weather and the action of windshield wipers and have to be re-applied at frequent intervals. Under conditions of heavy use in protracted bad weather, e.g., rain, sleet and snow, reapplication every three to four weeks or at even shorter intervals may be required. Further, the application of silicone spray products can cause "star" effects from lights during nighttime driving. Such star effects are believed to be the result of streaks in the applied coating resulting from uneven application or improper or incomplete buffing of the applied coating.

There are various known methods for treating a glass surface to enable the bonding to it of different types of surface coatings. Various methods are described in the article *Glass Surfaces: Old, New and Engineered* by Carlo G. Pantano (Department of Materials Science and Engineering, Materials Research Institute, University Park, Pa. 16802), the disclosure of which is incorporated by reference herein. Specific coatings applied to such treated glass include anti-reflective coatings and dichroics for cameras; low-emissivity coatings for energy-saving windows; coatings for scratch resistance; liquid-crystal coatings for display screens, etc.

Among coatings for self-cleaning glass surfaces is a hydrophilic coating of the anatase form of titanium dioxide which has been treated with ultraviolet light. Such coatings are actively involved in chemical reactions that break down organic material deposited on the coated glass surface and the coating's hydrophilic characteristics are said to cause water not to collect in beads but rather to sheet on the surface, thereby facilitating rapid, reduced-spotting evaporation of the water.

U.S. Pat. No. 7,288,532, issued Oct. 30, 2007 to Gregory F. Payne et al., and entitled "Modified Chitosan Polymers And Enzymatic Methods For The Production Thereof", discloses that enzymatic reactions may be employed to modify the chitosan in order to render it hydrophobic. The disclosure of U.S. Pat. No. 7,288,532 is incorporated by reference herein.

As used herein and in the claims, the word "durable" as applied to describe the hydrophobic coating applied to the surface of an article in accordance with the present invention, means a coating which may last for the entire useful life of the article, i.e., a coating which is "substantially permanent", or a coating which is not worn away in normal use over a period of years, e.g., at least one year of normal use of the article, such as the normal use of windshields or other glass articles. For such glass articles the coating is usually "substantially permanent".

SUMMARY OF THE INVENTION

Generally, the present invention comprises the steps of bonding chitosan to a glass surface, especially non-hydrophobic, e.g., hydrophilic, glass surfaces, and treating the normally hydrophilic chitosan to render it hydrophobic to provide a durable hydrophobic coating on the glass surface. These steps are preferably carried out in the order stated. The glass surface preferably is also treated to enhance the bondability of chitosan to it. Optionally, the chitosan itself may be treated to enhance its bondability before its application to the glass surface, although that is usually not necessary. In a preferred aspect of the invention, the glass surface is first treated to enhance the bondability of chitosan to it and, after adherence of the chitosan coating to the glass surface, the chitosan is treated to render it hydrophobic.

More specifically, in accordance with the present invention, there is provided a method of applying a hydrophobic coating onto a glass surface, the method comprising the following steps. A coating of chitosan is applied to the glass surface, and the coating of chitosan is treated to render it hydrophobic.

In another aspect of the present invention, the chitosan is in the hydrophilic form when it is applied to the glass surface to bond to the surface a hydrophilic coating of chitosan prior to treating the hydrophilic coating of chitosan to render it into hydrophobic form.

Another related aspect of the present invention provides for treating the glass surface before application of the chitosan to the surface to thereby enhance bonding of the chitosan to the glass surface.

Yet another aspect of the present invention comprises a method of applying a durable hydrophobic coating onto a glass surface. The method comprises the following steps. The glass surface is treated to enhance the ability of chitosan to bond to the treated glass surface as compared to the ability of chitosan to bond to an otherwise identical glass surface which has not been identically treated. Hydrophilic chitosan is applied to the treated glass surface to bond thereto a hydrophilic coating of chitosan. The hydrophilic coating of chitosan is then treated with one or more suitable reagents to render the hydrophilic coating hydrophobic.

The following features, alone or in any combination of two or more provide additional aspects of the present invention: the hydrophilic chitosan is applied to the glass surface from an aqueous solution containing the hydrophilic chitosan; the hydrophilic coating of chitosan is reacted with hexyloxyphenol in order to render the coating hydrophobic; treating the glass surface comprises etching the surface with sodium hydroxide then applying to the surface aminopropyltriethoxysilane (APES) and glutaraldehyde; treating the glass surface is carried out by submersion within the sodium hydroxide solution, washing with water, submersion in an APES-containing toluene solution, washing with non-APES-containing toluene, washing with dichloromethane and acetone, drying, submersion in an aqueous glutaraldehyde solution, washed with methanol and dried; prior to treating the glass surface by applying to it the coating of chitosan, treating the chitosan to enhance the ability of the chitosan to bond to the glass surface as compared to the ability of chitosan which is not identically treated to bond to an identical glass surface; and the glass surface to be treated is a non-hydrophobic surface.

An article aspect of the present invention comprises a glass article having at least one hydrophobic surface formed thereon by any of the methods described above.

DETAILED DESCRIPTION OF THE INVENTION AND SPECIFIC EMBODIMENTS THEREOF

The present invention permits the application to surfaces of a glass article, for example to windshields, windows or other glass surfaces, of a durable hydrophobic surface, one which will not readily be worn away in normal use as would, for example, a silicone-coated surface. The hydrophobic surface of the present invention is attained by use of a chitosan coating which is chemically bound to the glass and treated to be hydrophobic. This eliminates the need for frequent or any re-application of a hydrophobic coating, as is the case with known prior art products, such as silicone coatings, and provides other benefits attainable only by a durable, factory-applied hydrophobic coating. In addition, the treated chitosan is derived from chitin which is found in natural organic materials such as the shells of marine life creatures, especially crustaceans, certain fungi, algae, yeast and insects. Chitin is readily available in significant quantities. In fact, chitin is the second most abundant biopolymer, second only to cellulose. Shrimp shells, a waste product of shrimp processing, are a source of chitin which provides the raw material for the manufacture of chitosan.

Chitosan contains an amine group on each of its monomer units and its treatment to render it hydrophobic involves reactions with the amine groups on the chitosan polymer chain. Any optional treatment of chitosan to enhance its bondability to a glass surface would also involve the amine groups.

The chitosan coating is applied to the glass surface by first binding chitosan polymer to, for example, a windshield or other glass surface, which has been treated to make the glass surface reactive with chitosan to securely bond a chitosan coating to the glass surface. Thereafter, the chitosan may be treated through chemical and/or enzymatic means to better bond to the glass surface. After the chitosan has been bound to the glass surface, the normally hydrophilic chitosan is chemically and/or enzymatically treated to be hydrophobic. Once the chitosan is treated to be hydrophobic, the windshield or other glass surface now has a durable hydrophobic surface and will repel water, making it easier to see through the windshield or other glass in even the heaviest of downpours, and helping to maintain the windshield or other glass surfaces clean. Specifically, the hydrophobic coating reduces the need to use windshield wipers, prevents or at least greatly reduces water accumulation on the windshield and reduces water streaking and spotting. The reduction of water streaking and spotting by the hydrophobic coating will enable increasing the intervals between washing without adversely affecting the cleanliness of windows and other glass articles.

While any suitable process may be employed to produce chitosan from chitin, a useful process comprises manufacturing chitosan from naturally occurring chitin-containing organic materials. One useful chitosan manufacturing process is disclosed in U.S. patent application Ser. No. 12/406,476, filed on Mar. 18, 2009 and claiming priority of provisional patent application Ser. No. 61/037,742, filed Mar. 19, 2008, both applications being entitled "Chitosan Manufacturing Process".

While it is within the purview of the present invention to convert the chitosan to hydrophobic form before binding the converted hydrophobic chitosan to the glass surface, it is preferred to first bind the hydrophilic chitosan to the glass surface and only then convert the chitosan coating to hydrophobic form. There are at least two reasons for deferring the conversion to hydrophobic form until after the chitosan is bound to the glass surface. One reason is that both the reaction to bind chitosan to glass and the reaction to make chitosan hydrophobic utilize the amine groups that occur on every molecular unit in the chitosan chain. By making chitosan hydrophobic before binding it to the glass surface, there is the risk of using up too many amine groups in the conversion to the hydrophobic form and not having enough left to securely bind the hydrophobic chitosan to the glass surface. While it appears to be feasible to produce chitosan that could be reacted to produce the level of hydrophobicity that is required for purposes of this invention while still retaining a sufficient amount of amine groups to use in the glass attachment process, it is easier to attach the chitosan first to the glass surface and then enzymatically or otherwise react the remaining amine groups. The second and perhaps more important reason is that reactions with the amine groups of chitosan are generally carried out while chitosan is dissolved in an aqueous solution. If chitosan is first converted to a hydrophobic form, it will not dissolve in an aqueous solution and that may make it very difficult or even impossible to attach the chitosan to the glass surface. Therefore, it is preferred to first bond a coating of hydrophilic chitosan on the surface of the glass, and then convert that coating to hydrophobic form.

Generally, it is believed that no changes to the amine groups on the chitosan are required to bind the chitosan to a treated glass surface. The application of known bonding agents to the surface of the glass to which the chitosan is to be applied will durably, sometimes substantially permanently, bond the chitosan film or layer to the glass surface. For example, as disclosed in the above-mentioned paper *Glass Surfaces: Old, New and Engineered* by Carlo G. Pantano, glass surfaces are often primed with silane coupling agents to enhance the adhesion of a coating to the glass. The silane coupling agents are molecular species which bond to dangling bonds on the glass surface and react with functional groups in the material to be attached via the silane groups to the glass surface. In the case of chitosan, those functional groups are the amine groups of the chitosan polymer. Any suitable means of securely and durably bonding the chitosan film or layer to the glass surface may be utilized.

With respect to treatment of the applied, i.e., bonded, chitosan film or layer to render it hydrophobic, this requires the attachment of a chemical moiety to the sites of the amine groups, or to the amine groups themselves, on the chitosan polymer. An example of this technique is shown in an article by Tianhong Chen et al. entitled *Enzymatic Grafting of Hexyloxyphenol onto Chitosan to Alter Surface and Rheological Properties,* Biotechnology and Bio-engineering, Volume 70, No. 5, Dec. 5, 2000, published by John Wiley and Sons, Inc. As disclosed in that article, an enzymatic method is used to graft hexyloxyphenol onto the chitosan polymer. The enzyme tyrosinase was employed to convert the attached phenol into a reactive o-quinone, which then undergoes a subsequent nonenzymatic reaction with the chitosan. The paper reports that on the basis of contact angle measurements, such heterogeneous modification of a chitosan film yielded a hydrophobic surface.

While a major contemplated use of the hydrophobic-coated glass surfaces attainable by the practices of the present invention is to treat glass such as automotive windshields and other automotive glass, the present invention is also applicable to other glass objects such as aircraft and marine windshields and windows, window glass in homes, commercial buildings and factories, and other glass surfaces where a durable hydrophobic surface is desired.

EXAMPLE 1

A flat glass pane is cleaned with detergent and water to remove any surface impurities, then rinsed with deionized water. The glass pane is then immersed in a 4M NaOH solution which is agitated to facilitate movement of the solution along the surface of the glass pane. The solution is heated to 100° C. over a period of 15 minutes. The glass pane is allowed to soak in the heated 4M NaOH solution for an additional 15 minutes before being removed and rinsed with deionized water until the wash water registered a neutral pH. The glass pane is then dried. Performing this step increases the number of silanol groups (Si—OH) to enable adequate coupling of the chitosan to the glass, thereby increasing the coating coverage on the glass surface.

The glass pane is immersed in anhydrous toluene in a nitrogen atmosphere. Aminopropyltriethoxysilane (APES) is added to the toluene and the solution agitated at 80° C. overnight in the nitrogen atmosphere. The glass pane is removed and washed with toluene, dichloromethane and acetone, then is air-dried. The glass pane is then immersed in an aqueous 25% glutaraldehyde solution which is agitated at room temperature for one hour. The glass pane is removed, is washed with methanol and dried. This step creates the linkage on the glass surface for binding chitosan to the surface.

$NaBH_4$ is added to an 8% (w/w) solution of chitosan in 4% aqueous acetic acid and agitated. The glass pane is immersed in the chitosan solution and allowed to soak for one hour at room temperature. The glass pane is removed, is washed with deionized water and dried. This step binds the chitosan to the glass surface.

The chitosan-coated glass pane is added to a 50% v/v mixture of methanol and phosphate buffer with 6 mM hexyloxyphenol. The enzyme tyrosinase is added to the solution to catalyze the reaction between the bound chitosan and the hexyloxyphenol. The solution is mildly agitated for 24 hours. The glass pane is removed from the solution, is washed with methanol then deionized water, and dried. This step changes the chitosan from being hydrophilic to hydrophobic. Contact angle measurements are taken to gauge the extent to which the bound chitosan coating is hydrophobic.

What is claimed is:

1. A method of providing a durable hydrophobic chitosan coating on a glass surface, the method comprising:
    (a) treating the glass surface by applying to the surface a silane coupling agent comprising aminopropyltriethoxy silane ("APES") and glutaraldehyde to enhance the bondability of chitosan to the treated glass surface by making the glass surface chemically reactive with chitosan amine groups;
    (b) after step (a), applying chitosan to the glass surface to chemically bond thereto a durable coating of chitosan; and
    (c) reacting the chitosan with one or more suitable reagents to attach an enzyme-modified phenol to the chitosan to render the chitosan hydrophobic;
    to thereby provide the durable hydrophobic chitosan coating on the glass surface.

2. The method of claim 1 wherein the chitosan is in the hydrophilic form when it is chemically bonded to the surface to provide on the surface a bonded, durable hydrophilic coating of chitosan, and then carrying out step (c) to render the hydrophilic coating of chitosan hydrophobic.

3. The method of claim 1 or claim 2 wherein prior to applying the coating of chitosan to the glass surface, treating the chitosan to enhance the ability of the chitosan to bond to the glass surface as compared to the ability of otherwise identical chitosan which has not been identically treated to bond to an identical glass surface.

4. A method of providing a durable hydrophobic chitosan coating on a glass surface, the method comprising:
    (a) treating the glass surface_by applying to the surface a silane coupling agent to enhance the bondability of chitosan to the treated glass surface by making the glass surface chemically reactive with chitosan amine groups, the treatment being carried out by subjecting the glass surface to the following steps: submersion into a sodium hydroxide solution, washing with water, submersion in an APES-containing toluene solution, washing with non-APES-containing toluene, washing with dichloromethane and acetone, drying, submersion in an aqueous glutaraldehyde solution, washing with methanol, and drying;
    (b) treating hydrophilic chitosan by one or both of chemical and enzymatic means to enhance the ability of the chitosan to bond to the treated glass surface as compared to the ability of otherwise identical chitosan which has not been identically treated to bond to an identical treated glass surface;
    (c) after step (a), applying the treated hydrophilic chitosan to the treated glass surface to bond thereto a durable hydrophilic coating of chitosan; and
    (d) reacting the coating of chitosan with one or more suitable reagents comprising hexyloxyphenol to attach an enzyme-modified phenol to the chitosan to render the hydrophilic coating hydrophobic;
    to thereby provide a durable hydrophobic chitosan coating on the glass surface.

5. The method of claim 4 wherein the hydrophilic chitosan is applied to the glass surface from an aqueous solution of the hydrophilic chitosan.

6. A method of providing a durable hydrophobic chitosan coatinq on a glass surface, the method comprising:
    (a) treating the glass surface by applying to the surface a silane coupling agent comprising aminopropyltriethoxysilane ("APES") and glutaraldehyde to enhance the bondability of chitosan to the treated class surface by making the glass surface chemically reactive with chitosan amine qroups (b) after step (a), applyinq chitosan to the glass surface to chemically bond thereto a durable coatinq of chitosan; and
    (c) reacting the chitosan with one or more suitable reagents to attach an enzyme-modified phenol to the chitosan to render the chitosan hydrophobic to thereby provide the durable hydrophobic chitosan coatinq on the glass surface;
    wherein the treating of the glass surface in step (a) is carried out by subjecting the glass surface to the following steps: submersion into a sodium hydroxide solution, washing with water, submersion in an APES-containing toluene solution, washing with non-APES-containing toluene, washing with dichloromethane and acetone, drying, submersion in an aqueous glutaraldehyde solution, washing with methanol, and drying.

7. A method of providing a durable hydrophobic chitosan coating on a glass surface, the method comprising:
    (a) treating the glass surface by applying to the surface a silane coupling agent to enhance the bondability of chitosan to the treated glass surface by subjecting the glass surface to the following steps: submersion into a sodium hydroxide solution, washing with water, submersion in a toluene solution containing aminopropyltriethoxysilane ("APES"), washing with non-APES-containing toluene, washing with dichloromethane and acetone, drying, submersion in an aqueous glutaraldehyde solution, washing with methanol, and drying;

(b) after step (a), applying chitosan to the glass surface to chemically bond thereto a durable coating of chitosan; and (c) reacting the chitosan with hexyloxyphenol to render the coating of chitosan hydrophobic;

to thereby provide the durable hydrophobic chitosan coating on the glass surface.

8. A method of providing a durable hydrophobic chitosan coating on a glass surface, the method comprising:

(a) treating the glass surface by applying to the surface a silane coupling agent comprising aminopropyltriethoxysilane ("APES") and glutaraldehyde to enhance the bondability of chitosan to the treated glass;

(b) after step (a), applying chitosan to the glass surface to chemically bond thereto a durable coating of chitosan; and (c) reacting the chitosan with one or more suitable reagents to attach an enzyme-modified phenol to the coating of chitosan to render the coating hydrophobic;

to thereby provide the durable hydrophobic chitosan coating on the glass surface.

9. The method of claim 7 or claim 8 wherein the chitosan is in the hydrophilic form when it is chemically bonded to the surface to provide on the surface a bonded, durable hydrophilic coating of chitosan, and then carrying out step (c) to render the hydrophilic coating of chitosan hydrophobic.

10. A method of providing a durable hydrophobic chitosan coating on a glass surface, the method comprising:

(a) treating the glass surface by applying to the surface a silane coupling agent comprising aminopropyltriethoxysilane ("APES") and glutaraldehyde to enhance the bondability of chitosan to the treated glass surface by making the glass surface chemically reactive with chitosan amine groups;

(b) treating hydrophilic chitosan by one or both of chemical and enzymatic means to enhance the ability of the chitosan to bond to the treated glass surface as compared to the ability of otherwise identical chitosan which has not been identically treated to bond to an identical treated glass surface;

(c) after step (a), applying the treated hydrophilic chitosan to the treated glass surface to bond thereto a durable hydrophilic coating of chitosan; and (d) reacting the coating of chitosan with one or more suitable reagents comprising hexyloxyphenol to attach an enzyme-modified phenol to the chitosan to render the hydrophilic coating hydrophobic;

to thereby provide a durable hydrophobic chitosan coating on the glass surface.

11. The method of any one of claim 1, 4, 7, 8 or 10 wherein the glass surface to be treated is a non-hydrophobic surface.

12. An article having at least one surface having thereon a durable hydrophobic chitosan coating formed by the method of any one of claim 1, 4, 7, 8 or 10.

13. The article of claim 12 wherein the glass surface is selected from the group consisting of automotive glass including automotive windshields, aircraft and marine windshields, and windows and window glass in homes, commercial buildings and factories.

14. The article of claim 12 wherein the glass surface is a flat glass pane.

* * * * *